United States Patent
Stahl

(10) Patent No.: US 10,683,621 B2
(45) Date of Patent: Jun. 16, 2020

(54) GROUND MILLING MACHINE, IN PARTICULAR A ROAD MILLING MACHINE, AND METHOD FOR OPERATING A GROUND MILLING MACHINE

(71) Applicant: BOMAG GMBH, Boppard (DE)

(72) Inventor: Jonathan Stahl, Urmitz (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 15/851,793

(22) Filed: Dec. 22, 2017

(65) Prior Publication Data
US 2019/0024328 A1    Jan. 24, 2019

(30) Foreign Application Priority Data
Dec. 23, 2016   (DE) .................. 10 2016 015 499

(51) Int. Cl.
*E01C 23/088* (2006.01)
*E01C 23/01* (2006.01)
*E01C 23/12* (2006.01)

(52) U.S. Cl.
CPC ............ *E01C 23/088* (2013.01); *E01C 23/01* (2013.01); *B60G 2202/413* (2013.01); *B60G 2300/09* (2013.01); *E01C 23/127* (2013.01)

(58) Field of Classification Search
CPC ...... E01C 23/088; E01C 23/127; E01C 23/01; E01C 23/16; E01C 23/163; E01C 23/20;
(Continued)

(56) References Cited

U.S. PATENT DOCUMENTS 4,769,700 A    9/1988  Pryor
5,607,205 A *  3/1997  Burdick .................. E01C 19/00
                                                299/1.5
(Continued)

FOREIGN PATENT DOCUMENTS

DE    102007007970    11/2009
DE    102012021379     4/2014
(Continued)

OTHER PUBLICATIONS

Non-final Office Action from related U.S. Appl. No. 14/962,020, dated Jun. 30, 2017.
(Continued)

*Primary Examiner* — David J Bagnell
*Assistant Examiner* — Michael A Goodwin
(74) *Attorney, Agent, or Firm* — Grossman, Tucker, Perreault & Pfleger, PLLC

(57) ABSTRACT

The invention relates to a ground milling machine, in particular a road milling machine, comprising a machine frame, traveling devices connected to the machine frame, a drive engine, a ground milling device with a milling drum box open towards the ground and a milling drum mounted so as to be rotatable about a rotational axis inside the milling drum box, wherein the ground milling device is adjustable by means of an adjusting device between a raised transport position and a milling position engaging the ground, a conveyor device with at least one primary conveyor belt, with which milled material produced inside the milling drum box can be transported away from the ground milling device, the primary conveyor belt including a receiving side and a discharge side, a belt holder arranged in front of the ground milling device in the working direction of the ground milling machine, in which the receiving side of the primary conveyor belt is mounted, and an operator platform, from which (Continued)

an operator controls the ground milling machine in operation, as well as to a method for operating a ground milling machine. The invention facilitates an optimized handling of milling area obstacles located in the area of the milling track.

21 Claims, 5 Drawing Sheets

(58) Field of Classification Search
CPC ...... E01C 23/203; E01C 23/22; E01C 23/222; E01C 23/225; E01C 23/227
See application file for complete search history.

(56) References Cited

U.S. PATENT DOCUMENTS

| | | | |
|---|---|---|---|
| 5,947,385 A * | 9/1999 | Lanerd | E01C 23/166 239/146 |
| 6,776,557 B2 | 8/2004 | Barnat et al. | |
| 7,150,413 B1 | 12/2006 | Bricko et al. | |
| 7,422,391 B2 | 9/2008 | Holl et al. | |
| 8,113,592 B2 | 2/2012 | Busley et al. | |
| 8,308,395 B2 | 11/2012 | Jurasz et al. | |
| 9,133,586 B2 | 9/2015 | Reuter et al. | |
| 9,562,460 B2 | 2/2017 | Arai | |
| 9,699,968 B2 | 7/2017 | Posselius et al. | |
| 2006/0184013 A1 | 8/2006 | Emanuel et al. | |
| 2006/0198700 A1 | 9/2006 | Maier et al. | |
| 2008/0003057 A1 | 1/2008 | Hall et al. | |
| 2008/0152428 A1 | 6/2008 | Berning et al. | |
| 2008/0216021 A1 | 9/2008 | Berning et al. | |
| 2009/0010713 A1 | 1/2009 | Kotting et al. | |
| 2009/0015056 A1* | 1/2009 | Hall | E01C 23/088 299/39.6 |
| 2011/0010023 A1 | 1/2011 | Kunzig et al. | |
| 2012/0051839 A1 | 3/2012 | Begley et al. | |
| 2012/0230548 A1 | 9/2012 | Calman et al. | |
| 2012/0288328 A1 | 11/2012 | Minich | |
| 2013/0076101 A1 | 3/2013 | Simon | |
| 2013/0234493 A1* | 9/2013 | Emme | E01C 23/088 299/18 |
| 2013/0283924 A1 | 10/2013 | McCullough et al. | |
| 2014/0212217 A1 | 7/2014 | Wagner et al. | |
| 2014/0348584 A1* | 11/2014 | Fritz | G05D 1/0214 404/72 |
| 2016/0001818 A1 | 1/2016 | Thelen et al. | |
| 2016/0060826 A1* | 3/2016 | Berning | E01C 23/088 299/1.5 |
| 2016/0177522 A1 | 6/2016 | Nacke et al. | |
| 2018/0051427 A1* | 2/2018 | Lee | E01C 23/088 |
| 2018/0148899 A1* | 5/2018 | Maxwell | E01C 23/065 |

FOREIGN PATENT DOCUMENTS

| | | |
|---|---|---|
| DE | 102012024769 | 6/2014 |
| DE | 102013007061 | 7/2014 |
| DE | 102013010298 | 12/2014 |
| DE | 102015007937 | 7/2016 |
| EP | 2119832 | 11/2009 |
| EP | 2246485 | 11/2010 |
| JP | H07180107 | 7/1995 |
| WO | 2006/092441 | 9/2006 |

OTHER PUBLICATIONS

Notice of Allowance from related U.S. Appl. No. 14/962,020, dated Jan. 10, 2018.

* cited by examiner

GROUND MILLING MACHINE, IN PARTICULAR A ROAD MILLING MACHINE, AND METHOD FOR OPERATING A GROUND MILLING MACHINE

FIELD

The invention relates to a ground milling machine, in particular a road milling machine, as well as a method for operating a ground milling machine.

BACKGROUND

Essential elements of a generic ground milling machine include a machine frame, traveling devices connected to the machine frame, a drive engine, a ground milling device with a milling drum box open towards the ground and a milling drum that is mounted within the milling drum box and that is rotatable about a rotational axis extending horizontally and transversely to the working direction, the ground milling device being adjustable via an adjusting device between a lifted transport position and a milling position engaging the ground. The traveling devices are usually wheels and/or crawler tracks. They are usually arranged in front and rear pairs, although there can also be only a single front or rear running gear. It is further known to configure at least one of the running gears in such a way that it is adjustable relative to a side wall of the machine between an inner end position and an outer end position. The drive engine, typically a diesel engine, provides the drive power required for the operation of the self-propelled ground milling machine. The actual milling operations are performed with the aid of the rotating milling drum, which is, e.g., a supporting cylinder equipped with a plurality of milling tools on its outside jacket surface. The ground milling device is height-adjustable relative to the ground. To this end, the ground milling device can be adjustable relative to the machine frame and/or the traveling devices on the machine frame can be adjustable, in particular by means of lifting columns, so that the entire machine frame can be lifted and lowered. In the milling position, the ground milling device is lowered far enough toward the ground for the milling drum to engage the ground at a desired milling depth. In the transport position, in contrast, the milling drum is lifted out of the ground and kept at a relatively large vertical distance from the ground so that it is possible, e.g., to drive over small obstacles extending in the vertical direction, such as e.g. milling edges etc., while avoiding an undesired collision of the milling drum with the ground. The ground milling machine further comprises a conveyor device with at least one primary conveyor belt, with which milled material produced in the milling drum box can be transported away from the ground milling device, the primary conveyor belt including a receiving side and a discharge side. The receiving side refers to the end of the longitudinal primary conveyor belt at which milled material is loaded, in particular directly from the milling drum box, onto the primary conveyor belt. Accordingly, the discharge side refers to the end of the primary conveyor belt at which the milled material is discharged from the primary conveyor belt. The discharge can occur onto an additional, subsequent conveyor belt, for example an attachable conveyor belt, or onto a transport vehicle, or also onto the ground. Also provided is a belt holder, which is arranged in the working direction of the ground milling machine in front of the ground milling device and in which the primary conveyor belt is mounted on the receiving end side. In particular in the case of so-called compact milling machines, e.g. the BM500 and BM600 models of the applicant, the belt holder can be positioned behind the milling drum since the loading of, e.g., the truck occurs to the rear and, accordingly, the belt is located behind the milling machine and is oriented to the rear. The belt holder can form part of a so-called retaining device, which is usually a grate-like member skimming over the ground directly in front of the milling drum box during milling operation in order to prevent blocks of ground material from breaking away directly in front of the ground milling device. It is also possible, and comprised by the invention, to configure the belt holder in such a manner that it is separate from the retaining device, e.g., by means of a link connected to the milling drum box and/or the machine frame. Finally, the generic ground milling device comprises an operator platform, from which an operator can operate the ground milling machine in working operation. Generic ground milling machines of this type are disclosed, e.g., in DE102015007937A1, DE102015007562A1 and DE102014019168A1.

A precise steering of the ground milling machine during milling operation, e.g. in order to facilitate a precise milling along markings and/or obstacles such as curbs etc., is essential when using such ground milling machines. In this regard, it is known to use reference markings attached to the sides of the machine that are visible to the driver from the operator platform and that provide him/her with, e.g., a point of reference as to where a face side of the milling drum housed inside the milling drum box extends. Problematic, however, are in particular obstacles that lie within the milling width, e.g. manhole covers, etc. These obstacles are thus essentially merely "occasional" and are located within the area of the ground region to be milled, and thus need to be driven over by the ground milling machine during the milling process. It is not possible for the operator of the ground milling machine to mill along or past these obstacles, which will also be referred to as milling area obstacles in the following. Rather, in order to prevent damage to the ground milling device and/or the milling area obstacle itself, it is necessary to lift the ground milling device out of the milling position and into the transport position before the area obstacle in question, when viewed in the working direction, and, afterwards, to lower the ground milling device back into the milling position. In particular in order to minimize time-consuming subsequent work, it is advantageous here to mill in the working direction as closely to the area obstacle in question as possible and to resume the milling operation as closely as possible behind the area obstacle. However, as the milling drum is arranged inside the milling drum box, it is not possible for the driver of the ground milling machine to see the exact position of the milling drum and in particular its cutting edges transversely to the milling direction. Instead, he needs to estimate the approximate distance between the milling area obstacle and the front and/or rear cutting edge (i.e. the cutting circle) of the milling drum in the working direction of the ground milling machine. The concomitant inaccuracies increase either the subsequent manual work required or the risk of damage to the milling drum and/or the respective area obstacle.

SUMMARY

The object of the invention is thus to indicate a way to facilitate the handling of milling area obstacles for the operator during the milling process.

An essential, basic idea of the invention lies in a constructional optimization of the ground milling machine for the achievement of the stated object in combination with the special configuration of a control unit. As regards the constructional aspect according to the invention, a reference marking is arranged on the ground milling machine before the ground milling device in the working direction, said marking being located in front of the ground milling device at a reference distance extending horizontally and in the working direction towards the front. This reference marking serves as a valid means of comparison for the driver in order to be able to identify the beginning and/or the end of a milling area obstacle and to communicate it to the control unit in the manner described in more detail below. It is possible here that the reference marking is located in the working direction in front of the ground milling device and yet, with respect to the width of the ground milling device, outside the milling width, due, e.g., to a corresponding lateral offset. Preferably, however, the reference marking is arranged within the actual milling width of the milling drum when viewed in the working direction. This facilitates a detection of a front end and a rear end of an obstacle by the operator. According to the invention, the ground milling machine further comprises a viewing channel, preferably in the form of a reduction in the lateral outer shell of the machine, so that a driver located on the operator platform can look at the reference marking through the viewing channel, in particular from a standing and/or sitting operating position. Such a viewing channel can be, e.g., a recess in the machine's outer shell that is open to the side, upward and downward, as described, e.g., in DE102007033808A1. Additionally or alternatively, it is also possible to configure one or multiple viewing channels as a duct-like viewing opening in the interior of the machine. What is essential in both cases is that the viewing channel is formed so that the line of sight of the operator located on the operator platform extends linearly to the reference marking and in particular also to a ground region vertically below the reference marking. According to the invention, the ground milling machine further comprises a manually operated triggering device on the operator platform, via which the front end and/or the rear end of the obstacle can be signaled to the control unit by the operator. In a specific implementation, this can be, e.g., a push-button switch arranged on the operator platform, a mobile device connected to the control unit via a wireless signal line or a data cable, or the like. The beginning and/or end of the obstacle are entered by the driver when the reference marking, as seen from his/her operating position, becomes aligned with the front end of the milling area obstacle and the rear end of the milling area obstacle, respectively, as the ground milling machine drives over it.

A further essential element of the ground milling machine according to the invention is a control unit that is in signal communication with the triggering device and that controls the adjustment of the ground milling device, in a first step, from the milling position into a passing position in which the ground milling device is not in contact with the ground and/or, in a second step, from the passing position into the milling position. The actual milling position here depends on the set milling depth and can thus vary. The passing position, on the other hand, is characterized by the fact that, irrespective of the milling depth in question, the ground milling device is lifted completely out of the ground as regarded in the vertical downward direction, preferably by a predefined vertical safety clearance with respect to the unmilled ground surface. The ground is thus not milled in the passing position even if the milling drum rotates inside the milling drum box. In the passing position, the ground milling device can thus pass over the area obstacle without contacting and engaging it. According to the invention, the control unit is configured in such a manner that it will not trigger the first step (lifting the ground milling device from the milling position into the passing position) until the ground milling machine has traveled the reference distance from the front end of the obstacle during the working operation. Additionally or alternatively, it will also not trigger the second step (penetration of the ground by the ground milling device moving from the passing position into the milling position) until the ground milling device has essentially traveled the reference distance in the working direction from the rear end of the obstacle (preferably adding the penetration width of the milling drum into the ground in the working direction, as will be explained in more detail below). Overall, the first step and/or the second step thus occur at a time delay and/or distance offset in relation to the entry of the beginning and end of the obstacle by the driver. The distance offset here corresponds to the reference distance in the working direction of the ground milling machine. It is thus ensured that, although it is not directly visible from the operator platform, in particular as a result of being housed by the milling drum box, the milling drum is lifted up and lowered back relatively precisely before the front end of the area obstacle (start of obstacle) and after the rear end of the area obstacle (end of obstacle). The driver of the milling machine can thus now control this process relatively precisely and no longer needs to resort to inaccurate estimates. The invention thus relates both to the timely lifting of the ground milling device out of the milling position and into the passing position before the milling area obstacle as well as to the lowering of the ground milling device from the passing position into the milling position in the working direction behind the milling area obstacle. The invention relates both to embodiments which render only one of these two steps "raising" or "lowering" possible in accordance with the invention as well as to embodiments which render both steps possible. Therefore, when reference is made below to the "raising" and "lowering" in accordance with the invention, in order to avoid repetition, this is to be understood as analogously applying to variants that only provide for either a "raising" or a "lowering" in accordance with the invention. This applies to both the ground milling machine according to the invention as well as to the method according to the invention.

As already mentioned above, a region of the ground milling machine that is situated in the working direction within the milling width is preferably used for positioning the reference marking, the milling width designating the horizontal extension of the milling drum transversely to the working direction, i.e. its extension along its rotational axis. In particular, the reference marking can be arranged on the belt holder. The belt holder is frequently arranged centrally with respect to the milling width. The reference marking is then preferably arranged on the side of the belt holder facing the viewing channel. The reference marking can also extend laterally away from the belt holder and horizontally towards the outer side on which, e.g., the viewing channel is arranged.

The ground milling machine can further comprise a ground slider. This is a device that rests on the ground in front of the ground milling device in the working direction and is slid over the ground, e.g., in order to prevent blocks of ground material from being lifted off directly in front of the ground milling device. The ground slider, and here again a lateral region facing the viewing channel, also constitutes a preferred arrangement position for the reference marking.

It is also preferred to arrange the reference marking in the front region of the milling drum box, on the machine frame or one of the traveling devices or their mounts, in particular on an inner side of the traveling device, or its mount, facing the center of the machine.

The milling drum is frequently arranged at an off-center position on the ground milling machine in order to facilitate a milling as close to the edges as possible on one side and in order to be able to lead a power train to the milling drum on the other side. The side on which the milling drum extends with its face side essentially up to an outer side of the ground milling machine is also referred to as the zero side. It is thus on this side that a particularly precise milling laterally along obstacles is possible, as the zero side can be easily monitored from the operator platform. The reference marking is preferably arranged on the ground milling machine so that it is oriented towards a zero side of the ground milling machine. This side is used particularly frequently by the operator of the ground milling machine for steering the machine during the milling process. Additionally or alternatively, it is also possible to arrange the reference marking on the side opposite the zero side, in particular also e.g. on the belt holder or the ground slider.

An essential aspect of the invention resides in the raising of the milling drum of the milling device from an engaged position with the ground in front of the area obstacle and lowering it back into the ground behind the area obstacle in a coordinated manner by means of the inputs of the operator. The control unit here is preferably configured in such a manner that the passing position of the ground milling device already described above is located vertically between the milling position and the transport position. The control unit here thus raises the ground milling device as little as possible in order to attain just enough ground clearance so that the ground milling device can be moved over the area obstacle without contact. In the transport position, by contrast, the ground milling device is usually raised much further in the vertical direction in order to maximize the available ground clearance to the greatest extent possible so that the ground milling machine can drive over higher obstacles, such as e.g. a milling edge, without problems. The passing position is thus characterized in that the machine is lifted to a lesser extent compared to the transport position. This saves a considerable amount of time during the working process since the raising and lowering of the ground milling machine is executed much faster between the passing position and the milling position than between the milling position and the transport position. The passing position can be defined at the place of manufacture or, preferably, set individually by the operator of the ground milling machine. This permits an optimal definition of the passing position even when different ground milling devices, i.e. milling drums, are used. In this embodiment according to the invention, the control unit thus also comprises a learning or setting mode in which the height of the passing position relative to the unmilled ground is defined by the operator of the ground milling machine.

In the passing position of the ground milling device, the lower edge of the ground milling device is thus located only slightly above the unmilled ground surface. In order to prevent the operator from inadvertently traveling larger distances with the ground milling device in the passing position, the control unit preferably comprises a speed limit so that, when the ground milling device is in the passing position, the ground milling machine advances at a defined maximum speed or at a maximum speed not greater than the speed of advancement when the beginning and/or end of the obstacle was entered. The maximum speed defined here is significantly lower than a maximum transport speed of the ground milling machine at which it can travel during a positioning of the ground milling machine on the construction site.

The passing position is preferably defined in such a manner that the lower edge of the milling drum of the ground milling device facing the ground is located at a vertical distance of not more than 10 cm, particularly not more than 5 cm and especially not more 3 cm above the unmilled ground surface of the ground. This maximum elevation of the milling drum in the passing position has proven to be preferable in working situations.

A variety of alternative embodiments are possible with regard to the specific configuration of the adjusting device. For example, the front and/or rear traveling devices can be connected to the machine frame by means of lifting devices, in particular lifting columns or lifting gears. In this alternative, the height adjustment of the ground milling device relative to the ground thus occurs through a lifting or lowering of the entire machine frame in relation to the ground. Such lifting columns can, for example, each comprise a piston-cylinder unit, in particular enclosed by corresponding protective sleeves. Additionally or alternatively, the ground milling device can also be adjustable in relation to the machine frame of the ground milling machine at least partially in a vertical direction by means of an adjusting device, e.g. by means of a hydraulic lifting and/or swiveling system. Here, the ground milling device can be connected to the machine frame, for example, via a mounting arm on a rotatable joint.

In order to facilitate precise adjustments, the adjusting device additionally or alternatively comprises distance measuring sensors, in particular distance measuring sensors associated with the traveling devices respectively mounted so as to be height-adjustable in relation to the machine frame. In the present case, these distance measuring sensors serve to determine the adjustment distance of the traveling devices and/or of the ground milling device that is adjustable in relation to the machine frame. They can be, e.g., cable pulley sensors correspondingly arranged on those elements that are adjusted in relation to each other, or also in particular capacitive distance measuring sensors arranged inside a cylinder-piston unit. Additionally or alternatively, distance sensors with which the vertical distance of a reference on the machine side from the ground can be determined can also be used here. Corresponding distance measuring sensors can also be arranged on the side plates.

Generic ground milling machines are normally used at different milling depths. The penetration of the ground by the ground milling device can thus vary depending on the operation site. In order to drive over the milling area obstacle while avoiding a collision, however, it is necessary to ensure that, regardless of the milling depth, the passing position relative to the unmilled ground surface is always attained. According to the invention, this is achieved particularly effectively when the control unit comprises a correction function so as to adjust the raising of the ground milling device into the passing position to be sufficient regardless of the milling depth. The greater the milling depth, the farther the machine needs to be raised before it reaches the passing position. Alternatively, it is also possible to set a constant adjustment distance between the milling position and the passing position, although this variant is not optimal since the ground milling device will be lifted farther than actually necessary when the milling depths are small. It is thus advantageous if the passing position is defined as a fixed lifting height relative to the unmilled ground surface, which is approached from different milling depths. Thus, the lifting distance here varies depending on the milling depth so that a larger milling depth increases the lifting distance to be covered before the passing position is reached.

Additionally or alternatively, however, the control unit also comprises a correction function so that it adapts the reference distance as a function of the milling depth. The reference distance in the present case refers to the distance from the milling drum to the reference marking in the horizontal direction and in the working direction of the ground milling machine. The reference point of the reference distance at the ground milling device or milling drum can vary. This can be, e.g., the rotational axis of the milling drum plus a fixed buffer value that takes into account the width of the milling drum. A disadvantage of this solution is that, although the buffer value permits a milling that is quite close to the milling area obstacle, the unmilled surface segments remaining in front and behind it are still relatively broad (depending on the milling depth). Thus, according to a first further embodiment, the lifting and the lowering of the milling drum are based on two different reference distances. For example, for the lifting of the milling drum, this can be the horizontal distance in the working direction between the reference marking and the front edge of the milling drum box or the point of the cutting circle of the milling drum that is furthest to the front in the working direction, while, for the lowering of the milling drum, this can be the horizontal distance in the working direction between the reference marking and the rear edge of the milling drum box or the point of the cutting circle of the milling drum that is furthest to the rear in the working direction, or a comparable fixed point in front of (for raising) and behind (for lowering) the ground milling device. There is thus a specific reference distance for the lifting and the lowering of the ground milling device, respectively. This already produces considerably improved working results. These can be further optimized, however, if the control unit adapts the reference distance for the lifting and/or the lowering of the ground milling device to different milling depths with the aid of a correction function. To this end, the reference distance for lifting the ground milling device into the passing position can in particular be the horizontal distance in the working direction between the front edge of the milling drum engaging the ground and the reference marking, while, for lowering the ground milling device into the milling position, it can be the horizontal distance in the working direction between the rear edge of the milling drum (penetrating unmilled ground) and the reference marking. The deeper the ground milling device penetrates the ground, the further the front penetrating edge of the milling drum (=milling drum edge) in the working direction will shift toward the front (accordingly shortening the reference distance for the lifting operation), and the further the rear penetrating edge of the milling drum in the working direction will shift toward the rear (accordingly increasing the reference distance for the lowering operation). According to this advantageous embodiment, the control unit is thus configured to shorten the reference distance when the milling depth increases, in particular as a function of the cutting circle radius or diameter of the milling drum of the ground milling device, and vice versa. It is thereby ensured that a collision with an obstacle is reliably avoided even at large milling depths. It is particularly preferred here to reduce (for lowering) and/or increase (for lifting) the respectively defined reference distances by a quantity, in particular within a single-digit centimeter range in order to obtain a safety buffer in front of and behind the milling area obstacle, e.g. in order to be able to compensate for an inaccurate marking of the front end and/or the rear end of the obstacle by the operator.

The ground milling machine according to the invention can be further improved through further modifications. For example, a metal detector connected to the control unit is preferably provided in the working direction in front of the ground milling device. With the aid of the metal detector, obstacles hidden in the ground, such as pipelines or cables, can be reliably detected. The potential milling area obstacle thus no longer needs to be visible, as it is additionally possible to detect an obstacle that is not discernible from the outside by means of the metal detector. Additionally or alternatively, it is further possible to provide a distance measuring sensor, which monitors the distance traveled by the ground milling machine and transmits the distance measured to the control unit. With the aid of the distance measuring sensor, it is thus possible to determine particularly precisely the point as of which the ground milling machine has actually traveled the reference distance, i.e. the point as of which an adjustment of the ground milling device from the milling position into a passing position, and vice versa, should occur. With the aid of a distance measuring sensor, e.g. in the form of an attached measuring wheel or an rpm sensor in the drive motor of the crawler track and via which the speed/distance traveled is determined, a particularly precise adjustment of the ground milling device between the milling position and the passing position right in front of and behind the obstacle is possible. The distance can also be determined indirectly, e.g., with the aid of an angle measurement sensor arranged on a traveling device. Furthermore, additionally or alternatively, the ground milling machine can also include a speed sensor that monitors the advancing speed of the ground milling machine, which it transmits to the control unit. This preferred embodiment is particularly expedient when a maximum advancing speed is defined for the ground milling machine in working operation and/or transport.

The specific configuration of the reference marking can also vary. A variant with a fastening branch and a marking branch projecting from the latter is preferred. In an ideal arrangement, the marking branch runs flat and as parallel as possible, i.e. horizontally, to the ground. The marking branch preferably extends over a length of several centimeters horizontally and transversely to the working direction, ideally at least 5 cm, in order to facilitate an exact comparison with the front and rear ends of the milling area obstacle. Fastening occurs by means of the fastening branch, which can include, e.g., corresponding fastening openings, etc., for this purpose. Further, the reference marking preferably has a striking color, e.g. signal red, in order to stand out distinctly from the ground. Further, the reference marking is ideally made of an at least partly elastic material, preferably as one piece, e.g. of a plastic material, so that it will not be damaged when contacting small objects sticking up from the ground, such as stones lying on the ground surface. A protective device, e.g. a spring-loaded mounting, in particular of the marking branches, can also be provided in order to permit externally induced movements of the marking branch out of its reference position without damage and subsequently ensure that the marking branch automatically returns to its reference position.

The ground milling machine according to the invention is in particular a so-called cold road milling machine, particularly of the rear-rotor or center-rotor type, as described, e.g., in DE102015007937A1, DE102015007562A1, and DE102014019168A1.

A further aspect of the invention consists in a method for operating a ground milling machine, in particular a ground milling machine according to the invention, as described above. The method according to the invention essentially comprises the following steps A to F. In step A, the milling process is started by lowering the ground milling device into a milling position at a desired milling depth, while the ground milling machine advances in the working direction during milling. Step A thus represents the beginning and continued execution of the milling process. In a next step, according to the invention, if a milling area obstacle is encountered, a front end of the obstacle is marked by the operator, e.g. through manual actuation of a switch. This occurs at the point in time when a reference marking located at a reference distance from a ground milling device passes the front end of a milling area obstacle in the working direction. The ground milling machine meanwhile continues the milling operation in the working direction. Additionally or alternatively, a rear end of the obstacle is subsequently marked when the reference marking passes the end of a milling area obstacle. This is also performed in particular manually by the operator, e.g. by means of a corresponding actuation of a switch. The beginning and end of the obstacle are each transmitted to a control unit. This can occur via corresponding signal lines or also by means of a wireless data transmission. The control unit then controls a raising of the ground milling device into a passing position, which occurs at an delay relative to the marking of the beginning of the obstacle and not until the ground milling machine has traveled the reference distance. Reference is made to the above statements with respect to the specific meaning and configuration of the reference distance. The lifting thus occurs at a distance offset and at a time delay in relation to the marking of the front end of the obstacle. Time-delayed because the ground milling machine still has to reach the position of the front end of the obstacle; distance-offset because the position of the ground milling device at the time of the marking is different from its position at the time of the lifting. Additionally or alternatively, the ground milling device is also lowered into the milling position at a delay in relation to the marking of the rear end of the obstacle by means of the control unit once the ground milling machine has traveled the reference distance. The lowering thus also occurs at a distance offset/time delay in relation to the marking of the rear end of the obstacle. Thus, even though the marking of the start and end of the obstacle in the working direction of the ground milling machine occurs at different times/distances, a raising and lowering of the ground milling device that is relatively close to the beginning and end of the obstacle is achieved in this manner. With the aid of this method according to the invention, subsequent manual labor can be reduced considerably.

In the steps "raising the ground milling device into the passing position" and/or "lowering the ground milling device from the passing position into the milling position", an adaptation of the reference distance preferably occurs as a function of the milling depth of the ground milling device in the milling position. The deeper the penetration of the milling drum of the ground milling device in the ground, the farther the front cutting edge of the milling drum moves forward in the working direction in the unmilled ground, and the farther the rear cutting edge of the milling drum moves backward in the working direction at the level of the unmilled ground. By means of the adaptation of the reference distance depending on the milling depth in accordance with the invention, the front and rear ends of the obstacle can thus be approached in a particularly precise manner. Reference is made to the above statements with respect to further details regarding the adaptation of the reference distance as a function of the milling depth.

In a preferred embodiment of the method according to the invention, the milling device in the transport position is at a vertical distance, i.e. raised, from the unmilled ground farther than in the passing position. The vertical distance between the milling device and the ground is thus preferably larger in the transport position than in the passing position. In this manner, it is ensured, first, that collisions are avoided better during transport operation as a result of the increased vertical distance. Moreover, the time lost during a milling operation for an adjustment of the ground milling device between the milling position and the passing position is reduced considerably so that a continuous milling operation is possible even when there is a relatively high density of milling area obstacles.

BRIEF DESCRIPTION OF THE DRAWINGS

The invention will be explained in more detail below with the help of the examples depicted in the figures, which show schematically.

DETAILED DESCRIPTION

Identical components are designated by the same reference numbers in the figures, although recurring components may not be designated in every figure separately.

Figure 1:
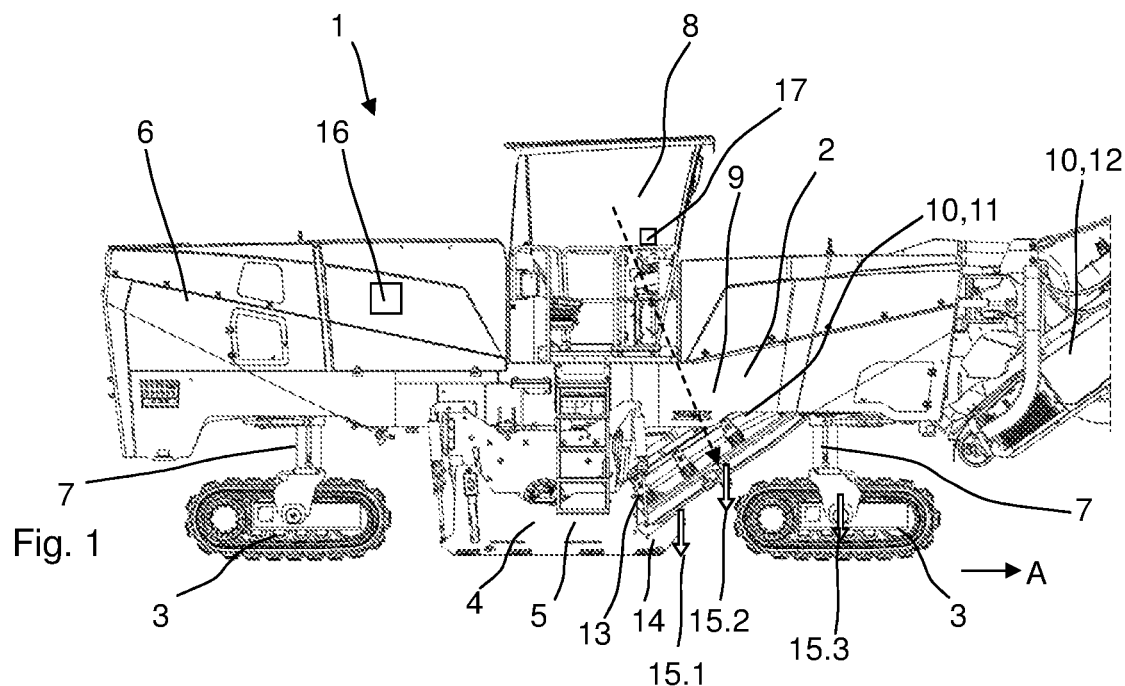
FIG. 1 is a side view of a ground milling machine with a mid-mounted rotor.

FIG. 1 shows a side view of a ground milling machine with a mid-mounted rotor. Essential elements of the ground milling machine 1 are a machine frame 2, traveling devices 3, which can be crawler tracks, as is the case here, or wheels, a ground milling device 4 comprising a milling drum box 5 and a milling drum (not visible in FIG. 1) mounted so as to be rotatable about a rotational axis extending horizontally and transversely to the working direction, as well as a drive device 6, which in the present case is a diesel combustion engine. The ground milling device 4 is height-adjustable in a vertical direction in relation to the ground. The traveling devices 3 in the present embodiment are thus connected via lifting columns 7 to the machine frame 2, on which the ground milling device 4 is mounted. A height adjustment of the lifting columns 7 thus simultaneously brings about a height adjustment of the ground milling device 4 and in particular of the milling drum inside the milling drum box 5 in relation to the ground. The ground milling machine 1 is operated from an operator platform 8, which in the present embodiment is located essentially in the middle of the ground milling machine 1 in the working direction A. From the operator platform 8, the driver can view a lateral ground region (on the right in this case) in front of the milling drum box 5 as well as the right front crawler track and the lateral outer region of the milling drum box 5. In the present embodiment, this is also possible on the opposite side (not shown in the figures). To this end, a reduction 9 forming a viewing channel is provided in the outer shell of the ground milling machine 1 by providing a recess in the lateral outer wall of the ground milling machine 1 towards the center in the region of the reduction 9. The ground milling machine 1 further comprises a conveyor device 10 with a primary conveyor belt 11 and a secondary conveyor belt 12. The primary belt conveyor 11 is mounted at its lower side towards the milling drum box 5 in a belt holder 13. Towards the sides, the milling drum box 5 further comprises height-adjustable side plates 14. In milling operation, the milling drum box 5 is lowered until the milling drum arranged inside the milling drum box 5 penetrates the ground to be processed at the desired milling depth. The ground milling machine 1 then advances in the working direction A in order to mill the ground.

Figure 2:
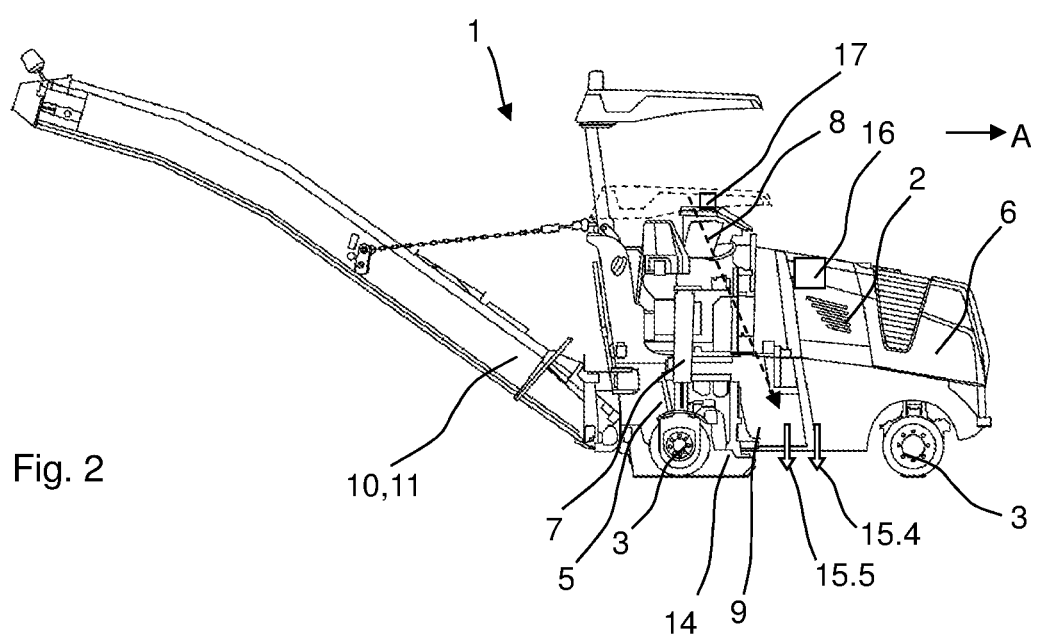
FIG. 2 is a side view of a ground milling machine with a rear-mounted rotor.

FIG. 2 shows an alternative embodiment of the ground milling machine 1, i.e. a milling machine with a rear-mounted rotor. In contrast to the ground milling machine 1 in accordance with FIG. 1, the milling drum box 5 is arranged in the rear region between the two rear traveling devices 3. The material is discharged via the conveyor device 10 arranged at the rear. As a precaution, it is noted that the invention is not limited to these two configurations. For example, in particular milling machines with rear-mounted rotors that discharge to the front are known. In order to effect a height adjustment in the variant shown in FIG. 2, the rear traveling devices 3 are connected to the machine frame 2 via lifting columns 7. The front traveling devices 3 do not have to be, but can also be height-adjustable. Further, the milling machine with the rear-mounted rotor according to FIG. 2 also comprises a reduction 9 (only on one side here), which is in particular also designed to receive the right rear traveling device 3, which can be adjusted, in a manner known per se in the prior art, from the position shown in FIG. 2, in which it is extended and located next to the milling drum box 5, into a position in which it is swiveled to the front of the milling drum box 5.

What is essential in the two ground milling machines of FIGS. 1 and 2 is the arrangement of at least one reference marking 15, which, in order to illustrate this aspect of the invention in greater detail, is arranged here in alternative arrangement positions on the ground milling machines 1 in the form of arrows pointing downward. In practice, only a single reference marking is required as a reference point in the manner described in greater detail below. At position 15.1 (FIG. 1), the reference marking is arranged on the belt holder 13, more specifically on a belt shoe. At position 15.2 (FIG. 1), by contrast, the reference marking is arranged on an outer side of the conveyor device 10, specifically on the lower third of the primary conveyor belt 11. Finally, at position 15.3 (FIG. 1), the reference marking is arranged on the traveling device 3 (or on its mount at the lifting column 7), in particular on its inner portion facing the machine center (as opposed to the embodiment shown in FIG. 1). All positions 15.1, 15.2 and 15.3 can be seen by the operator, at least in a lateral position on the operator platform 8, in particular through the reduction 9 already described. The line of sight is indicated by the dashed arrow shown in FIG. 1. In the embodiment in accordance with FIG. 2, the reference marking is arranged inside the reduction 9 at its lower end. Position 15.4 (FIG. 2) designates here a transverse wall located at the front in the working direction, through which the reduction 9 forms an inward recess. At position 15.5 (FIG. 2), by contrast, the reference marking is arranged on the recessed and thus internally positioned outer wall of the reduction 9. Again, both positions of the reference marking 15 can be seen from the operator platform 8 (the line of sight is again indicated by the dashed arrow). What is also essential here is that the reference marking 15 is arranged inside the reduction so that it does not interfere with the swiveling traveling device 3, for example, during zero-side edge milling.

A further element of the ground milling machine 1 of FIGS. 1 and 2 is an actuating device 17 which is connected to the control unit 16 and is arranged in the region of the operator platform 8. Alternatively, the actuating device 17 can also be a mobile device, in particular in a wireless data connection with the control unit 16. Further, the control unit 16 is in a control connection with the hydraulic lifting system of the lifting columns 7. With the aid of one of the reference markings 15 mentioned above, it is now possible for the operator of the ground milling machine 1 to mark the beginning and end of a milling area obstacle in the working direction A through an actuation of the actuating device 17, in particular when the reference marking 15 is above the milling area obstacle. These "markings" are transmitted to the control unit 16. FIGS. 1 and 2 illustrate that the reference marking 15 is clearly at a distance from the following milling device 3 in the working direction A. According to the invention, the control unit 16 controls the corresponding lifting device with a distance and time delay relative to the actuation of the actuating device 17 by the operator, i.e. facilitates a compensation of the differences in distance between the marking obtained with the aid of the reference marking 15 and the actual approach of the milling area obstacle by the ground milling device 4. This process is described in greater detail in FIGS. 3A to 3H for the purposes of further illustration. FIG. 3I, moreover, illustrates the adjustment of the ground milling machine 1 for a transport phase of the ground milling machine 1.

Figure 3A:
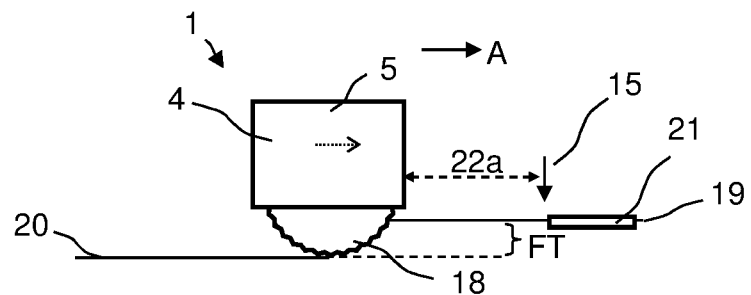
FIGS. 3A to 3I is a graphic illustration of the control sequence in accordance with the invention.
Figure 3B:
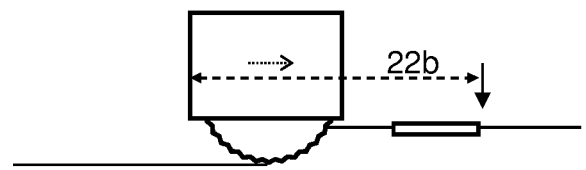
Figure 3C:
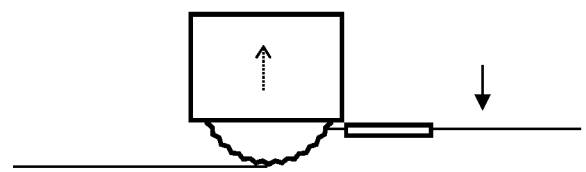
Figure 3D:
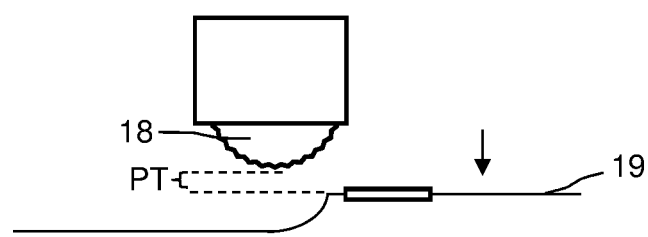
Figure 3E:
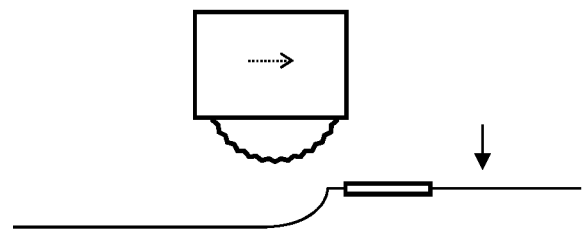
Figure 3F:
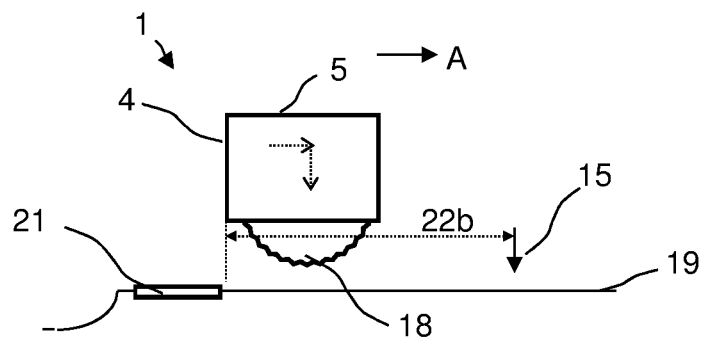
Figure 3G:
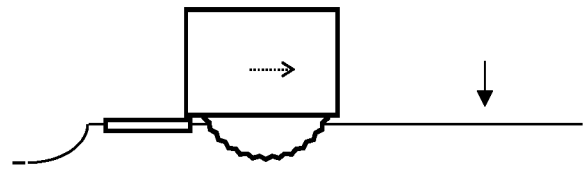
Figure 3H:
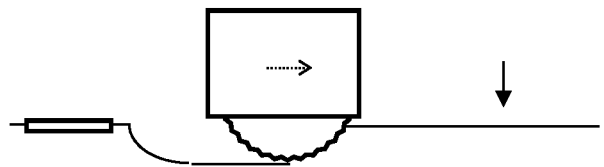
Figure 3I:
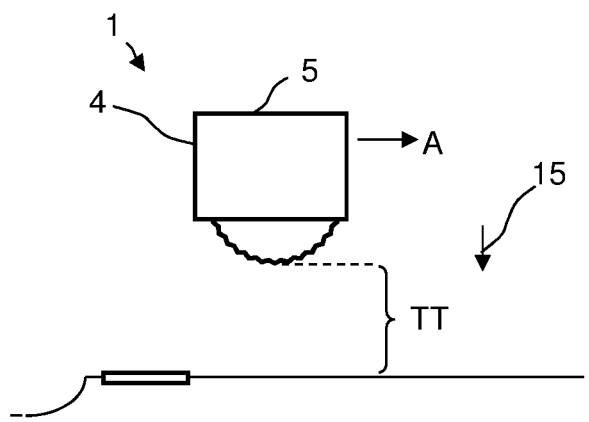

FIGS. 3A to 3I each show only a section of the ground milling machine 1, specifically the reference marking 15 and the ground milling device 4 comprising the milling drum box 5 and the milling drum 18, the corresponding relevant reference numbers only being indicated in FIGS. 3A and 3F for reasons of clarity. In the present embodiment, the reference marking 15 and the ground milling device 4 are connected to each other in a fixed position in relation to each other by means of the machine frame shown, e.g., in FIGS. 1 and 2. FIGS. 3A to 3I further show a ground surface 19 in a unmilled state and a ground surface 20 in a milled state. Accordingly, the height level of the ground surface 20 is vertically lowered in relation to the ground surface 19 by the milling depth FT. Further, a milling area obstacle 21 is shown, e.g. a manhole cover, which absolutely should not be run over by the ground milling device 4 during a milling operation. FIGS. 3A to 3I illustrate the operating principle of the ground milling machine 1 according to the invention and the functions according to the invention from the perspective of the ground milling machine 1 so that, in the milling operation shown in FIGS. 3A to 3H, the ground moves from right to left. The individual relative movements are indicated in the figures by dotted arrows.

FIG. 3A shows the ground milling machine 1 with the milling drum 18 engaging the ground 19 at the milling depth FT. The ground milling machine 1 moves relative to the ground in the working direction A in a self-propelled manner and thus continues to approach the milling area obstacle 21.

In the situation shown in FIG. 3A, the reference marking 15 is located at the beginning of the milling area obstacle 21. At this point, the beginning of the obstacle is marked by the operator of the ground milling machine, who can see the position of the reference marking 15 above the front end of the milling area obstacle 21 from the operator platform 8. The ground milling device is located at the reference distance 22a behind the marking, i.e. behind the beginning of the milling area obstacle 21 at this point in time. The ground milling machine 1 continues its milling operation and comes closer and closer to the milling area obstacle 21, as illustrated in FIG. 3B. In the situation shown in FIG. 3B, the reference marking 15 is located at the rear end of the milling area obstacle 21 with respect to the working direction A so that a reference distance 22b from the reference marking 15, i.e. from the rear end of the milling area obstacle 21, to the rear end of the ground milling device 4 is provided. This position is also relayed to the control unit 16 by the operator of the ground milling machine 1 by means of a second actuation of the actuating device 17 (FIGS. 1 and 2). After the reference marking 15 passes the milling area obstacle 21 in the present embodiment, the control unit 16 triggers a raising of the milling device 18 out of the ground shortly before reaching the milling area obstacle 21 once the ground milling machine has traveled the reference distance 22a (FIG. 3A). The raising according to FIG. 3C thus occurs at a distance offset/time delay relative to the marking of the beginning of the milling area obstacle 21 according to FIG. 3A. Specifically, the control unit 16 uses the reference distance 22a, which indicates the horizontal distance in the working direction A between the reference marking 15 and the front end of the ground milling device 4 or the desired maximum approach of the milling area obstacle 21 by the ground milling device 4. For the raising of the milling drum 18 according to FIG. 3C, the control unit thus first considers the length of the reference distance 22a, which is, e.g., stored in the control unit 16, calculated or specified by the operator, and the distance traveled by the ground milling machine since the marking of the beginning of the milling area obstacle 21 according to FIG. 3A and the end of the milling area obstacle 21 according to FIG. 3B. Suitable sensors, e.g. distance sensors, can be arranged on the ground milling machine 1 for this purpose.

The milling drum 18 is raised from the milling position according to FIGS. 3A to 3C into a passing position according to FIG. 3D. In the passing position, the milling drum 18, i.e. the lower edge of the ground milling device 4, is located at a vertical distance PT above the unmilled ground surface 19. The vertical distance PT in the passing position here is selected so that, first, it is ensured that the ground milling device 4 and in particular the lower side of the milling drum 18 does not collide with the milling area obstacle 21. Second, the passing position is selected so that the ground milling device 4 is not raised too far in order to minimize as much as possible the delay in the milling process caused by the raising of the ground milling device 4. In practice, it has proven ideal to set the passing position at a vertical distance PT in a range from 1 cm to 20 cm and in particular from 1 cm to a maximum of 10 cm.

Once the ground milling device 4 reaches its passing position, the ground milling machine 1 continues traveling in the working direction A with the milling drum raised out of the ground, while the transition between FIGS. 3C to 3H can also be controlled by the control unit 16 without even a temporary stopping of the ground milling machine 1. The ground milling device 4 is thus disengaged from the ground when being moved over the milling area obstacle, as shown in FIGS. 3D, 3E and 3F.

Once the milling area obstacle has been passed, the control unit 16 lowers the ground milling device 4 back into the milling position at the milling depth FT (FIG. 3G). For this purpose as well, the control unit 16 uses the reference distance, the reference distance 22b in the present embodiment, as well as the distance measurement described above and the marking of the end of the milling area obstacle (FIG. 3B) by the operator. This ensures that the ground milling device 4 only penetrates the ground again at the desired distance offset/time delay in relation to the reference marking 15 after passing the milling area obstacle 21. The milling process can then be continued, as shown in FIG. 3H.

As already mentioned above, the ground milling device 4 in the passing position is guided over the unmilled ground surface 19 as close to the ground as possible. This is, however, not suitable for transport trips with the ground milling machine 1, which then frequently needs to drive over obstacles projecting further upward in the vertical direction. To this end, the ground milling device 4 is raised into a transport position TT, in which the vertical distance from the lower side of the ground milling machine 4 and in particular of the milling drum 18 to the unmilled ground surface 19 is considerably larger than the vertical distance PT in the passing position. This is illustrated in more detail in FIG. 3I. It has proven advantageous if the ratio of the vertical distances TT to PT is at least 3:1, and in particular greater than 4:1.

Figure 4:
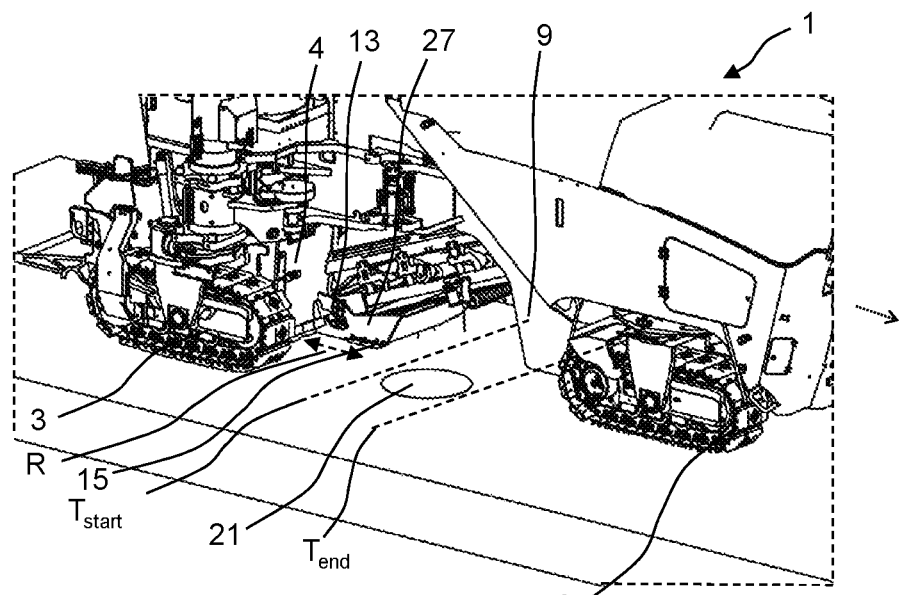
FIG. 4 is an oblique perspective of the region in front of the milling device in the working direction in a milling machine with a rear-mounted rotor.

FIG. 4 shows an oblique front perspective view of the region of the reduction 9 of a milling machine with a rear-mounted rotor, comparable to the type shown in FIG. 2 in a side view. In this specific embodiment, the reference marking 15 is arranged in the front lateral region of a ground slider 27 with a belt holder 13 and protrudes horizontally and transversely to the working direction. The ground slider is arranged directly in front of the ground milling device 4 and slides on the unmilled ground 19 during milling operation. The reference marking 15 here is specifically configured as an angular member, as illustrated in greater detail below. The reference marking 15 is arranged in the vertical direction in the lower region of the ground slider 27 facing the unmilled ground 19 so that it is guided very closely to the ground. The reference marking 15 is thus offset, by the reference distance 22, in the milling direction in front of the ground milling machine 4. Due to the reduction 9 in the outer shell of the ground milling machine 1—which is, e.g., also provided for receiving the traveling device 3, which is adjustable from the swiveled-out position shown in FIG. 4 to an inner, swiveled-in position for milling closely along edges—a viewing channel is obtained via which a driver on the operator platform 9 can see the reference marking 15, which is offset inward with respect to the lateral outer edge of the ground milling device 1. This side is also referred to as the zero side of the ground milling machine 1. When the reference marking 15 passes the beginning and end of the milling area obstacle 21 during a milling operation, the operator signals this to the control unit 16 as described above, e.g., through actuation of a corresponding push button. The beginning and the end of the milling area obstacle, which in FIG. 4 has a circular shape, here respectively designate the points of the milling area obstacle 21 furthest to the front and to the rear in the milling direction. In other words, the beginning of the milling area obstacle is expediently defined by a tangent running horizontally and transversely to the working direction at the horizontal outer contour of the milling area obstacle 21 and intersecting the outermost point of the milling area obstacle 21 against the milling direction, while the end of the milling area obstacle is expediently defined by a tangent running horizontally and transversely to the working direction and intersecting the outermost point of the milling area obstacle 21 in the milling direction. In FIG. 4, these tangents are designated by Tstart (beginning of the obstacle) and Tend (end of the obstacle).

Figure 5:
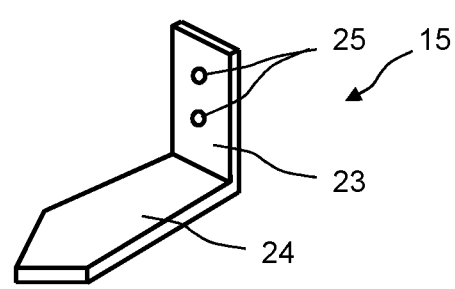
FIG. 5 is an oblique perspective of a reference marking.

The basic structure of the reference marking 15 of FIG. 4 is illustrated in greater detail in FIG. 5. In the present embodiment, the reference marking 15 comprises a fastening branch 23 and a marking branch 24 protruding perpendicularly from the fastening branch 23 in the horizontal direction. The fastening branch 23 and the marking branch 24 thus form an angular member, which in the present case is one solid piece, while fastening means 25 apertures for receiving e.g. screw elements in the present case—for attachment to the ground milling machine 1, in the present case to the belt holder, are provided. Other expedient connections can alternatively be used here, e.g. clamp connections, adhesive connections, etc. Further, the reference marking 15 is preferably made of an at least partially elastic material, e.g. a plastic material (e.g. polyethylene), in order to prevent irreversible damage in case of collision, e.g. with stones lying on the unmilled ground, as far as possible. Ideally, the reference marking 15 is attached to the ground milling machine 1 in a region as close to the ground as possible. This means that the vertical distance between the unmilled ground and the lower side of the marking branch 24 is as small as possible, in particular in the single-digit centimeter range, especially in a range from 3 cm to a maximum of 10 cm. Distances smaller than this increase the risk of collisions with the ground, while larger distances cause a considerable increase in parallax errors. This facilitates a particularly precise estimation by the operator as to when the reference marking 15 is at the level of the beginning and end of the milling area obstacle 21, i.e. at the level of the tangents Tstart and Tend, as in this case the risk of potential parallax errors is only minimal.

Figure 6:
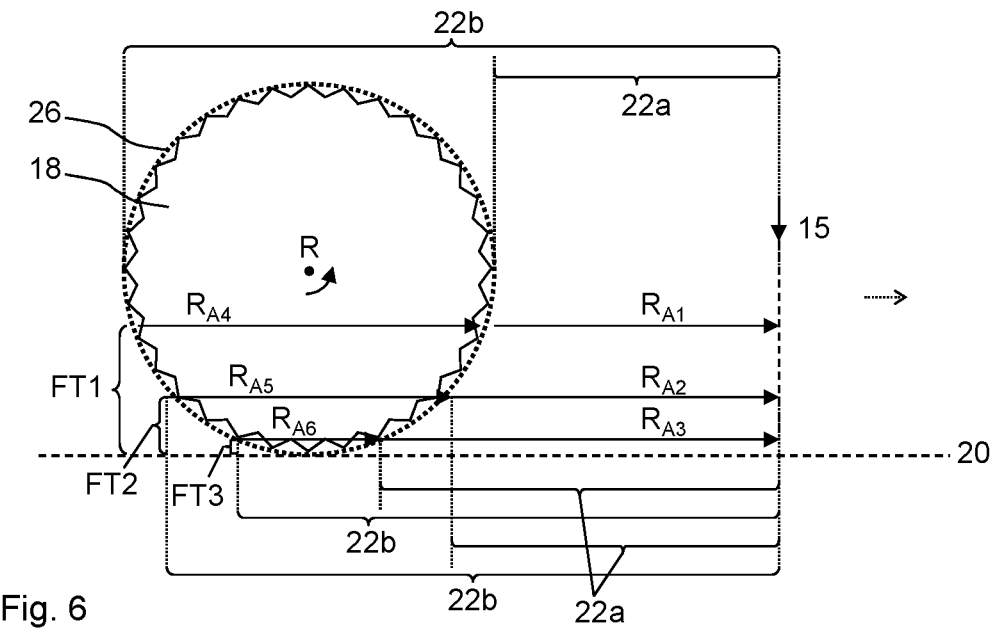
FIG. 6 is a graphic illustration of the operating principle of a correction function depending on the milling depth.

FIG. 6 illustrates the operating principle of a correction function in more detail and shows the adaptation of the reference distance considered by the control unit 16 for raising the ground milling device 4 before the milling area obstacle 21 and lowering it behind the milling area obstacle 21 depending on the current milling depth of the milling drum in the ground. In FIG. 6, the cutting circle 26 of the milling drum 18 of the ground milling device 4 is indicated as a dotted line. The cutting circle 26 thus designates the contact region of the milling drum 18 furthest away from the rotational axis R of the milling drum 18 in the radial direction, and is usually defined, e.g., by chisel tips. The reference distance 22 is designated by the corresponding arrows RA1, RA2 and RA3 for different milling depths FT1, FT2 and FT3. For the milling depth FT1, the reference distance 22a results from the arrow RA1, and the reference distance 22b results from RA1 and RA4. For the milling depth FT2, the reference distance 22a results from arrow RA2, and the reference distance 22b results from RA2 and RA5. For the smallest milling depth FT3 shown, the reference distance 22a results from arrow RA3, and the reference distance 22b results from RA3 and RA6. In the case of the reference distance RA1, approximately one third of the milling drum is immersed in the ground. In the case of the reference distance RA2, approximately one fifth is immersed, while in the case of the reference distance RA3, the penetration of the ground is minimal. In FIG. 5, the milling depths FT1, FT2 and FT3 are also indicated with respect to the milled ground surface 20. The control unit 16 now adapts the reference distance 22 (specifically the reference distance 22a for raising and the reference distance 22b for lowering the milling drum) in accordance with the milling depth FT in order to account for the round shape of the milling drum. Specifically, the reference distance 22a considered by the control unit for the lifting of the milling drum decreases as the milling depth FT increases (from FT3 towards FT1), while, for the lowering of the milling drum, it increases as the milling depth increases (from FT3 towards FT1). In this manner, it is ensured that changes in the penetration width (i.e. the maximum extension of the milling drum in the working direction with respect to the unmilled ground, which in FIG. 6 corresponds to the reference distances RA4, RA5 and RA6 for the milling depths FT1, FT2 and FT3) of the milling drum in the working direction, as a result of different milling depths, are taken into account and adapted accordingly by the control unit 16 when triggering the raising and lowering of the milling drum. This facilitates a particularly precise milling close to the milling area obstacle 21 and a lowering of the ground milling device 4 closely behind the milling area obstacle 21 in the working direction without damaging the latter with the milling drum 18.

Figure 7:
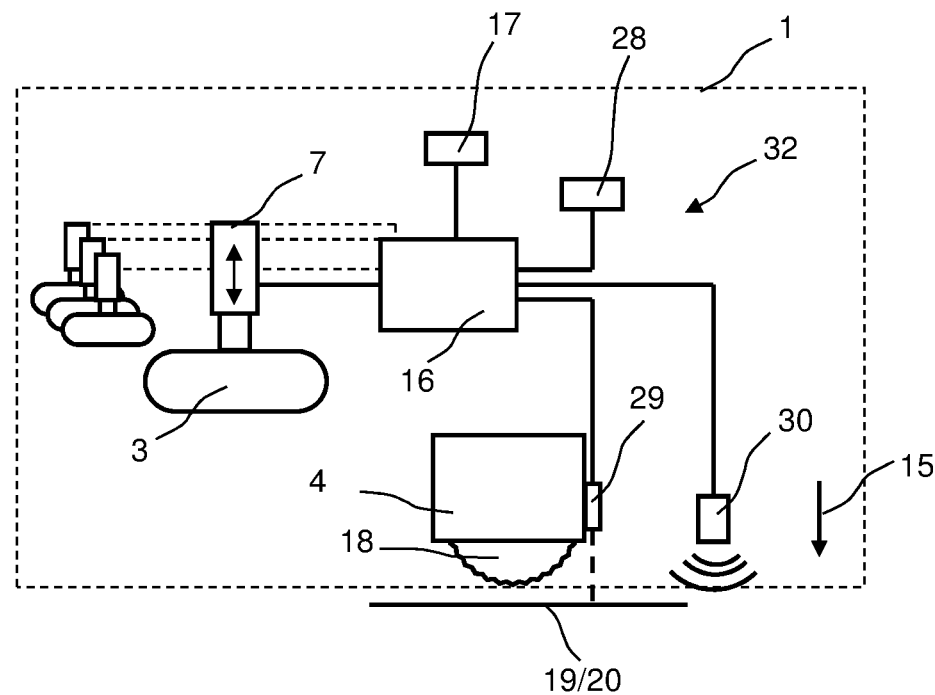
FIG. 7 is a schematic view of a system for implementing the invention.

FIG. 7 illustrates the basic structure of a corresponding control system 32 for implementing the present invention, e.g., with the ground milling machine 1 of FIG. 1 or FIG. 2. The ground milling machine 1 is height-adjustable by means of the lifting columns 7 of the traveling devices 3, although in FIG. 7 the control of merely one of a total of 4 lifting columns 7 by the control unit 16 is shown for the sake of clarity. The other three traveling devices, which are only roughly indicated in FIG. 7, are also, in particular individually, controlled by the control unit 16. The control unit 16 is connected to the lifting columns 7 so that it can control an extension or retraction of the lifting columns in the vertical direction (as indicated by the double arrow in FIG. 6), specifically, e.g., by controlling corresponding valves of a hydraulic system, etc. From the operator platform 8 of the ground milling machine 1 (according to FIGS. 1 and 2), the operator of the ground milling machine 1 monitors an alignment of the reference marking 15 with the front and rear ends of a milling area obstacle, as described above. If such an event occurs, then he actuates the actuating device 17. The actuating device 17 can, e.g., comprise an actuating button for entering a front end and another actuating button for entering a rear end of an obstacle. However, the invention also comprises embodiments according to which only a single push-button is provided, and, e.g., when the push-button is actuated, the signaling of a beginning and end of a milling area obstacle is either always assumed by the control unit 16 in alternation, or the front and rear ends of the milling area obstacle are differentiated by means of different kinds of input, e.g. a long and a short actuation.

The control system 32 illustrated in FIG. 7 further comprises a distance measuring device 28, which determines the distance traveled by the ground milling machine 1 per unit of time directly or indirectly. This may consist, e.g., in sensors which determine the absolute distance traveled by the ground milling machine, such as corresponding measuring wheels, etc., or in indirect methods, e.g., by means of a revolution sensor arranged in the crawler track, etc. Specifically, in the present embodiment, e.g. as depicted in FIG. 1 or 2, the distance measurement occurs via an rpm sensor provided in the drive engine of the crawler track. With the aid of the distance measuring device 28, the control unit 16 can thus ascertain when the ground milling machine 1 has traveled the reference distance described above from the entry of the beginning and/or end of the obstacle and can accordingly trigger the raising and lowering of the ground milling machine at a distance offset/time delay by means of the vertical adjustment of the lifting columns 7, in particular at least of the lifting columns of the rear traveling devices in the working direction.

In the present embodiment, the control device 16 is further configured to adapt the reference distance 22 as a function of the milling depth. The system 32 thus comprises a milling depth measuring sensor 29, which can be, e.g., a distance sensor, specifically an ultrasonic sensor or the like, by means of which the particular distance from the ground can be determined. Indirect methods of determination, such as e.g. corresponding distance measuring devices in the lifting columns 7, distance measuring sensors on the side plates, etc., can alternatively be used here as well. The control unit automatically adapts the respective reference distances 22, in particular as described in greater detail with respect to, e.g., FIG. 5, depending on the milling depth determined by the milling depth measuring device 29.

The control system according to FIG. 7 further comprises a detection device 30, e.g., in the form of a metal detector or the like. In contrast to the reference marking 15, the detection device 30 can help detect obstacles hidden in the ground and can optionally also be used by the control unit 16 for determining the beginning and end of an obstacle. This process runs completely automatically without any intervention by the operator, although it can also be provided that the operator confirms or dismisses ground obstacles detected by the device 30.

Figure 8:
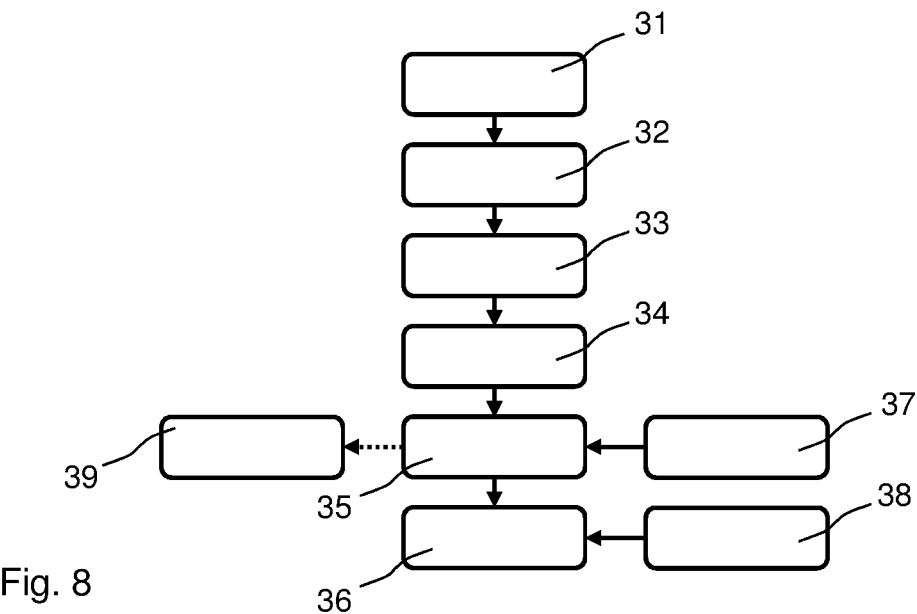
FIG. 8 is a flowchart of a method according to the invention.

Finally, FIG. 8 illustrates the essential steps of the method according to the invention, in particular for the operation of the ground milling machines described above. The starting point of this method lies in the starting of the milling process by lowering the ground milling device into a milling position at a desired milling depth and the subsequent forward motion of the ground milling machine in a working direction according to step 31. If milling area obstacles are encountered in the milling track during the milling operation, in step 32, the operator marks a front end of the obstacle when a reference marking located at a reference distance from a ground milling device passes the front end of the obstacle in the working direction. Reference is additionally made here in particular to the above statements with regard to this step and the subsequent steps.

In step 33, the operator marks a rear end of the obstacle when the reference marking passes the rear end of the obstacle in the working direction. Reference is made to the above statements in this regard as well.

In step 34, the front and rear ends of the obstacle are transmitted to a control unit, in particular to the aforementioned control unit 16, while this obviously does not need to occur simultaneously. It goes without saying that the order of steps 32, 33 and 34, as well as of the subsequent steps 35 and 36, can vary depending on the extension of the milling area obstacle in the working direction of the ground milling machine, and that they can also overlap.

Depending on steps 32 and 33, in step 35, the control unit first triggers a raising of the ground milling device 1 into a passing position, which occurs with a delay in relation to the marking of the front end of the obstacle and only when the ground milling machine has traveled the reference distance (with respect to the position of the ground milling machine 1 when the front end of the obstacle was marked in step 32) defined and monitored by the control unit, and, second, a lowering of the ground milling device 4 into the milling position, which occurs with a delay in relation to the marking of the rear end of the obstacle and only when the ground milling machine has traveled the reference distance (with respect to the position of the ground milling device in step 33) defined and monitored by the control unit.

In this method according to the invention, the control unit preferably adapts the reference distance as a function of the milling depth in the milling position of the ground milling device 4. This can consist in a reduction 37 of the reference distance in step 35 and/or in an increase 38 of the reference distance in step 36 if the milling depth increases or decreases in relation to an initial or reference milling depth.

According to another essential aspect that may be comprised by the method according to the invention, the raising of the ground milling device into the passing position occurs in such a way that the distance of the ground milling device from the unmilled ground surface is very small. By comparison, in step 39, the method according to the invention thus preferably further comprises a raising of the ground milling device 4 considerably beyond the passing position in the vertical direction in order to bring the ground milling device into a transport position in which the vertical distance of the ground milling device 4 from the ground is considerably greater.

What is claimed is:

1. A ground milling machine, comprising:
   a machine frame;
   a plurality of traveling devices connected to the machine frame;
   a drive engine;
   a ground milling device with a milling drum box open towards ground and a milling drum mounted so as to be rotatable about a rotational axis (R) inside the milling drum box, wherein the ground milling device is adjustable via an adjusting device between a raised transport position of the ground milling device and a milling position of the ground milling device to engage the ground;
   a conveyor device with at least one primary conveyor belt, with which milled material produced inside the milling drum box is transportable away from the ground milling device, wherein the primary conveyor belt has a receiving side and a discharge side;
   a belt holder arranged in front of the ground milling device in a working direction of the ground milling machine and in which the receiving side of the primary conveyor belt is mounted;
   an operator platform, from which an operator controls the ground milling machine in operation;
   a reference marking arranged on the ground milling machine in a front of the ground milling device in the working direction (A) of the ground milling machine, the reference marking being located in the front of the ground milling device at a reference distance extending horizontally and in the working direction (A) of the ground milling machine towards the front;
   a viewing channel arranged such that an operator located on the operator platform and having a line of sight can see the reference marking through the viewing channel via the line of sight;
   a manually operated actuating device by which a beginning (Tstart) and/or an end (Tend) of an obstacle is enterable by the operator;
   a control unit is provided which controls an adjustment of the ground milling device from the milling position into a passing position, in which the ground milling device is not in contact with the ground, in a first step and/or from the passing position into the milling position in a second step;

wherein the control unit is configured in such a manner that it only triggers the first step when the ground milling machine has travelled the reference distance from the beginning of the obstacle in the working direction during a working process and/or only triggers the second step when the ground milling machine has travelled the reference distance from the end of the obstacle in the working direction (A).

2. The ground milling machine according to claim 1, wherein the reference marking is arranged on the belt holder.

3. The ground milling machine according to claim 1, wherein the ground milling machine comprises a ground slider arranged in front of the ground milling device in the working direction (A) and in that the reference marking is arranged on the ground slider.

4. The ground milling machine according to claim 1, wherein the reference marking is arranged on the ground milling machine so as to be disposed towards a zero side of the ground milling machine.

5. The ground milling machine according to claim, 1, wherein the control unit is configured such that the passing position of the ground milling device lies in a vertical direction between the milling position and the transport position.

6. The ground milling machine according to claim 1, wherein the control unit comprises a speed limit so that, when the ground milling device is in the passing position, the ground milling machine advances at a defined maximum speed or at an advancing speed at the time of entry of the beginning and/or end of the obstacle.

7. The ground milling machine according to claim, 1, wherein the passing position is defined in such a manner that a lower edge of the milling drum facing the ground is located at a vertical distance of not more than 10 cm above an unmilled surface of the ground.

8. The ground milling machine according to claim, 1, wherein the adjusting device includes at least one of the following features:
   front and/or rear traveling devices are connected to the machine frame via lifting devices;
   the ground milling device is adjustable in relation to the machine frame of the ground milling machine by the adjusting device; and
   the adjusting device comprises distance measuring sensors associated with the traveling devices.

9. The ground milling machine according to claim, 8, wherein the lifting devices comprise at least one lifting column.

10. The ground milling machine according to claim, 8, wherein the distance measuring sensors are mounted in a height-adjustable manner in relation to the machine frame.

11. The ground milling machine according to claim, 1, wherein the control unit includes a correction function in such a manner that it adapts the reference distance depending on a milling depth (FT).

12. The ground milling machine according to claim, 1, wherein it includes at least one of the following features:
   the provision of a metal detector, connected to the control unit, in front of the ground milling device in the working direction;
   the provision of a distance measuring sensor that monitors a distance travelled by the ground milling machine, which it transmits to the control unit; and
   the provision of a speed sensor that monitors an advancing speed of the ground milling machine, which it transmits to the control unit.

13. The ground milling machine according to claim, 1, wherein the milling drum is mounted at a rear of the ground milling machine or in a middle of the ground milling machine.

14. The ground milling machine according to claim, 1, wherein the ground milling machine is a road milling machine.

15. The ground milling machine according to claim, 1, wherein the plurality of traveling devices comprise at least one of at least one crawler track and at least one wheel.

16. The ground milling machine according to claim, 1, wherein the manually operated actuating device is disposed on the operator platform.

17. The ground milling machine according to claim, 1, wherein the viewing channel is in a form of a reduction in a lateral outer shell of the ground milling machine, such that the operator located on the operator platform can see the reference marking through the viewing channel via the line of sight.

18. The ground milling machine according to claim, 1, wherein the viewing channel is configured as a duct-like viewing opening in an interior of the ground milling machine, such that the operator located on the operator platform can see the reference marking through the viewing channel via the line of sight.

19. A method for operating a ground milling machine, comprising:
   obtaining the ground milling machine, wherein the ground milling machine comprises
   a machine frame;
   a plurality of traveling devices connected to the machine frame;
   a drive engine;
   a ground milling device with a milling drum box open towards ground and a milling drum mounted so as to be rotatable about a rotational axis (R) inside the milling drum box, wherein the ground milling device is adjustable via an adjusting device between a raised transport position of the ground milling device and a milling position of the ground milling device to engage the ground;
   a conveyor device with at least one primary conveyor belt, with which milled material produced inside the milling drum box is transportable away from the ground milling device, wherein the primary conveyor belt has a receiving side and a discharge side;
   a belt holder arranged in front of the ground milling device in a working direction of the ground milling machine and in which the receiving side of the primary conveyor belt is mounted;
   an operator platform, from which an operator controls the ground milling machine in operation;
   a reference marking arranged on the ground milling machine in a front of the ground milling device in the working direction (A) of the ground milling machine, the reference marking being located in the front of the ground milling device at a reference distance extending horizontally and in the working direction (A) of the ground milling machine towards the front;
   a viewing channel arranged such that an operator located on the operator platform and having a line of sight can see the reference marking through the viewing channel via the line of sight;

a manually operated actuating device, by which a beginning (Tstart) and/or an end (Tend) of an obstacle is enterable by the operator;

a control unit is provided which controls an adjustment of the ground milling device from the milling position into a passing position, in which the ground milling device is not in contact with the ground, in a first step and/or from the passing position into the milling position in a second step;

wherein the control unit is configured in such a manner that it only triggers the first step when the ground milling machine has travelled the reference distance from the beginning of the obstacle in the working direction during a working process and/or only triggers the second step when the ground milling machine has travelled the reference distance from the end of the obstacle in the working direction (A);

starting a milling process by lowering the ground milling device into the milling position at a desired milling depth and by a forward motion of the ground milling machine in the working direction (A);

marking a beginning of an obstacle when the reference marking passes a beginning of the obstacle in the working direction;

marking an end of the obstacle when the reference marking passes an end of the obstacle in the working direction;

transmitting the beginning and end of the obstacle to the control unit;

raising the ground milling device by the control unit into the passing position, after marking the beginning of the obstacle and only when the ground milling machine has travelled the reference distance;

lowering the ground milling device by the control unit into the milling position, after marking the end of the obstacle and only when the ground milling machine has travelled the reference distance.

20. The method according to claim 19, wherein the reference distance is adapted as a function of a milling depth (FT) in the milling position of the ground milling device.

21. The method according to claim 19, wherein in the transport position, the ground milling device is further away from an unmilled ground in a vertical direction than in the passing position.

* * * * *